July 15, 1947.  W. H. WOODWARD  2,424,009
LAMP SOCKET MOUNTING
Filed March 4, 1943
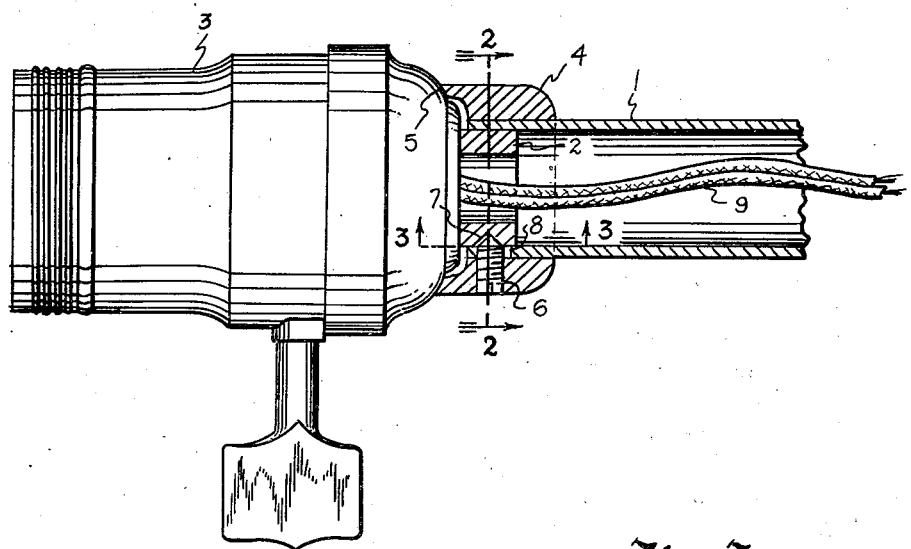
Fig. 1
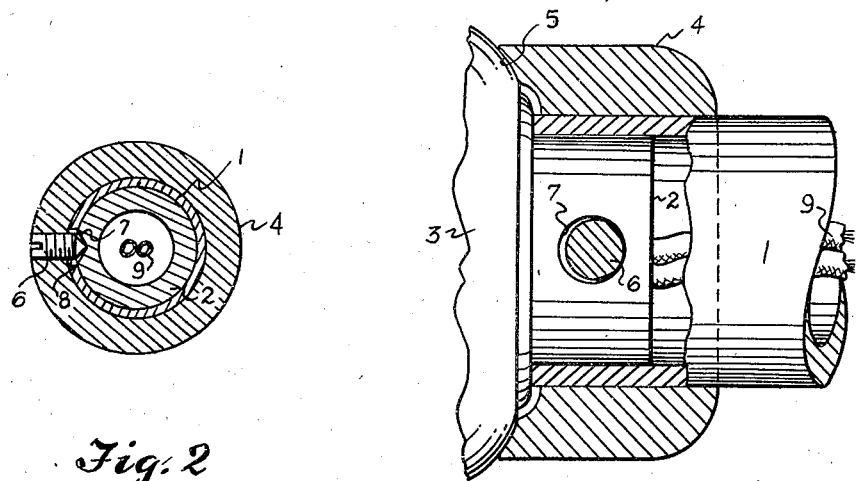
Fig. 2
Fig. 3
Inventor
William H. Woodward
By J. S. Murray
Attorney Patented July 15, 1947

2,424,009

UNITED STATES PATENT OFFICE 2,424,009

LAMP SOCKET MOUNTING

William H. Woodward, Detroit, Mich.

Application March 4, 1943, Serial No. 478,041

7 Claims. (Cl. 173—362)

This invention relates to lamp socket mountings, and particularly to provisions for mounting lamp sockets on bracket arms.

Brackets comprising arms carrying standard shell lamp sockets are commonly mounted on machines subjecting such brackets to considerable vibration and thus tending to loosen the sockets. Also the repeated screwing of bulbs into and out of sockets and adjustment of the brackets to meet different working conditions have a tendency to loosen the latter, unless quite securely fastened.

An object of the invention is to provide means for securing lamp sockets on tubular arms in a permanently rigid manner while affording rapid assembly by unskilled workmen.

Another object is to adapt the bushing which projects from the closed end of a standard shell lamp socket to be inserted in a tubular arm, and to so engage the socket by a collar exteriorly fitted on the arm as to attach the socket in a rigid and permanent manner to the arm.

These and various other objects are attained by the construction hereinafter described and illustrated in the accompanying drawing, wherein:

Fig. 1 is a side elevational view of a standard shell lamp socket, sectionally showing my improved provision for securing same on a tubular bracket arm.

Fig. 2 is a cross sectional view of said attaching means taken on the line 2—2 of Fig. 1.

Fig. 3 is another sectional view of said attaching means, taken on the line 3—3 of Fig. 1.

In these views, the reference character 1 designates a tubular bracket arm whose interior diameter affords a slip fit to the bushing 2 which rigidly and centrally projects from the closed end of a standard shell lamp socket 3. Exteriorly slipped on the arm 1 is a collar 4 having an end face 5 chambered to afford such face a firm seat against the rounded closed end of the socket. A set screw 6 radially interengages the collar 4, arm 1, and bushing 2, the collar being threaded to retain said screw and the bushing being formed with a conical recess 7 receiving the conical end of the screw. An opening 8 in the arm 1 accommodates the screw 6 freely, but without material lost motion. When the collar 4 seats against the socket 3, the radial axis of the threaded opening of the collar is slightly further from the body of the socket than the radial axis of the recess 7. This has the effect of clamping the collar firmly against the rounded closed end of the socket since the screw tends to shift said axes into coincidence. A cord 9 comprising wires leading to the socket extends through the arm 1 and bushing 2.

It has been found that the described construction accomplishes a much stronger, firmer and more permanent mounting of the socket on the tubular arm than provisions heretofore made. It has been common heretofore to screw a relatively small tube in the bushing of the socket and to clamp said tube by a set screw threaded into the bushing, but such an arrangement is not suited to withstand severe vibration or strains. The described collar 4 bearing tightly on the socket and firmly carried on the arm 1 has sufficient diameter to assure a very strong connection.

It is to be observed that the described construction lends itself to a rapid assembly operation and is of a quite inexpensive nature.

The end face 5 of the collar 4 is so chamfered that only an annular outer portion of said face may seat against the socket. This derives a maximum value from said collar in reinforcing and bracing the socket, and maintaining rigidity of the connection between the socket and arm 1.

When the screw 6 is firmly seated in recess 7, it exercises a dual function, serving not only to draw the socket and collar 4 into firm engagement but also to clamp said collar tightly on the arm 1. The stresses applied by the screw in exercising its last-mentioned function act along the screw axis, while stresses transverse to such axis are applied in interengaging the socket and collar 4.

What I claim is:

1. In a lamp socket mounting, the combination with a tubular arm, of a lamp socket having a projecting portion fitted into said arm, a collar fitted over said arm and having an end face firmly seating against the body of the socket outwardly from said projecting portion, and a set screw threaded into said collar, passing through said arm and terminally seated in a recess of the projecting portion, whereby the socket and collar are both rigidly secured to the arm and the collar is held tightly against the socket.

2. In a lamp socket mounting, the combination with a tubular arm, of a lamp socket having a rounded closed end remote from its socket-forming end and having a central projection at said closed end fitted into said arm, a collar fitted over said arm and having an end face firmly engaging the closed end of the socket and chamfered to substantially conform to the rounded shape of such end, and a fastening element extending through said arm and rigidly interconnecting said projection and collar and effecting a firm seating of said chamfered face against the socket.

3. A lamp socket mounting as set forth in claim 1, the radial axes of said screw and recess being slightly spaced lengthwise of the arm and the recess being coned, to urge the socket and collar into firm engagement as the screw is seated in said recess.

4. A lamp socket mounting comprising a tubular arm, a lamp socket mounted on an extremity of the arm and projecting along the extended axis of the arm, a collar fitted on the arm in proximity to the socket, and an element inserted in the collar and securing the collar rigidly on the arm and further interengaging the collar firmly with the socket.

5. A lamp socket mounting comprising a tubular arm, a lamp socket mounted on an extremity of the arm and projecting along the extended axis of the arm, a collar fitted on the arm in proximity to the socket, and an element mounted in said collar and securing it rigidly on the arm and further stressing the collar and socket lengthwise of the arm into firm interengagement.

6. A lamp socket mounting comprising a tubular arm, a lamp socket mounted on an extremity of the arm and having a hollow projecting portion fitted in the arm, a collar embracing the arm, and a set screw threaded into said collar, passing through the arm and terminally seated in a recess of said projecting portion.

7. In a lamp socket mounting, the combination with a tubular arm, of a lamp socket having a projection from an end thereof fitted into said arm and having a rounded face outwardly of said projection, a collar slip-fitted over said arm and presenting a recessed face to the socket, and said face having an annular seat against the rounded face of the socket, outwardly of said recess, and a common means for rigidly interconnecting the arm, projection and collar and for thrusting the collar firmly against said rounded face.

WILLIAM H. WOODWARD.

REFERENCES CITED

The following references are of record in the file of this patent:

UNITED STATES PATENTS

| Number | Name | Date |
|---|---|---|
| 1,336,395 | Swanson | Apr. 6, 1920 |
| 932,893 | Palmer | Aug. 31, 1909 |
| 1,193,025 | Klein | Aug. 1, 1916 |
| 1,474,015 | Benjamin | Nov. 13, 1923 |
| 552,319 | Farrey | Dec. 31, 1895 |
| 23,033 | Lawton et al. | Feb. 22, 1859 |